(12) United States Patent
Augustinowicz

(10) Patent No.: US 9,613,304 B2
(45) Date of Patent: Apr. 4, 2017

(54) SMARTCARD CONNECTOR

(71) Applicant: Identity Stronghold, LLC, Englewood, FL (US)

(72) Inventor: Walter P. Augustinowicz, Englewood, FL (US)

(73) Assignee: Identity Stronghold, LLC, Englewood, FL (US)

( * ) Notice: Subject to any disclaimer, the term of this patent is extended or adjusted under 35 U.S.C. 154(b) by 346 days.

(21) Appl. No.: 14/034,729

(22) Filed: Sep. 24, 2013

(65) Prior Publication Data

US 2014/0024226 A1 Jan. 23, 2014

Related U.S. Application Data

(63) Continuation-in-part of application No. 12/758,586, filed on Apr. 12, 2010, now Pat. No. 8,723,675.

(Continued)

(51) Int. Cl.
*G06K 19/00* (2006.01)
*G06K 19/077* (2006.01)

(52) U.S. Cl.
CPC ......... *G06K 19/005* (2013.01); *G06K 19/077* (2013.01); *G06K 19/07741* (2013.01)

(58) Field of Classification Search
CPC G06K 7/10297; G06K 7/0008; G07F 7/1008; G07F 7/0886; G07F 7/0893; G06Q 20/341; G06Q 20/327
See application file for complete search history.

(56) References Cited

U.S. PATENT DOCUMENTS

| 5,880,769 A | 3/1999 | Nemirofsky |
| 6,085,449 A | 7/2000 | Tsui |

(Continued)

FOREIGN PATENT DOCUMENTS

| JP | 2003099742 | 4/2003 |
| KR | 1020090088057 | 8/2009 |

(Continued)

OTHER PUBLICATIONS

European Patent Office Search Report for European Serial No. 12826259.9; Original Search Completed Feb. 5, 2015; Received and Printed on Aug. 27, 2015.

*Primary Examiner* — James Yang
(74) *Attorney, Agent, or Firm* — Neustel Law Offices; Michael S. Neustel

(57) ABSTRACT

A smartcard connector for connecting a smartcard within a card holder to an electronic device. The smartcard connector includes a card holder having a card holding space, a contact pad integral with the card holder and in communicative contact with the card holding space, and an external adapter integral with the card holder and in electrical contact with the contact pad. The adapter is for communicatively connecting a smartcard received and held within the card holding space and in electrical contact with the contact pad to an external data cable. The data cable is also connected to an electrical device, such as a computer, so that the smartcard may be accessed by the computer without removing the smartcard from the card holder. The card holder may also include a battery, display screen, read/write memory, security unit, notification unit, amplification unit, and/or a light.

18 Claims, 18 Drawing Sheets

Related U.S. Application Data

(60) Provisional application No. 61/169,516, filed on Apr. 15, 2009.

(56) References Cited

U.S. PATENT DOCUMENTS

| | | | |
|---|---|---|---|
| 6,121,544 | A | 9/2000 | Petsinger |
| 6,470,284 | B1 * | 10/2002 | Oh .................. G06F 13/4068 |
| | | | 702/64 |
| 6,752,305 | B2 | 6/2004 | Shattuck |
| 6,845,863 | B1 | 1/2005 | Riley |
| 6,883,718 | B1 | 4/2005 | Le |
| 6,991,483 | B1 | 1/2006 | Milan |
| 7,598,875 | B2 | 10/2009 | Noguchi |
| 7,635,089 | B2 | 12/2009 | Augustinowicz |
| 8,038,068 | B2 | 10/2011 | Yuzon |
| 2003/0066893 | A1 * | 4/2003 | Yap .................. G06F 3/0488 |
| | | | 235/487 |
| 2004/0069853 | A1 | 4/2004 | Aharonson |
| 2004/0129785 | A1 | 7/2004 | Luu |
| 2005/0077348 | A1 | 4/2005 | Hendrick |
| 2005/0189425 | A1 | 9/2005 | Itou |
| 2006/0180674 | A1 | 8/2006 | Margalit |
| 2006/0219776 | A1 | 10/2006 | Finn |
| 2006/0236117 | A1 * | 10/2006 | Lazaridis .................. G06K 7/01 |
| | | | 713/185 |
| 2006/0278723 | A1 | 12/2006 | Dan |
| 2007/0040017 | A1 | 2/2007 | Kozlay |
| 2007/0099662 | A1 | 5/2007 | Gallagher |
| 2007/0109130 | A1 | 5/2007 | Edenfield |
| 2008/0308640 | A1 | 12/2008 | Chien |
| 2013/0233924 | A1 * | 9/2013 | Burns .................. G06K 7/0021 |
| | | | 235/441 |

FOREIGN PATENT DOCUMENTS

| | | |
|---|---|---|
| KR | 2020090012142 | 12/2009 |
| WO | WO2004036495 | 4/2004 |

* cited by examiner

SMARTCARD CONNECTOR

CROSS REFERENCE TO RELATED APPLICATIONS

I hereby claim benefit under Title 35, United States Code, Section 120 of U.S. patent application Ser. No. 12/758,586 filed Apr. 12, 2010. This application is a continuation-in-part of the Ser. No. 12/758,586 application. The Ser. No. 12/758,586 application is now issued as U.S. Pat. No. 8,723,675. The Ser. No. 12/758,586 application is hereby incorporated by reference into this application.

I hereby claim benefit under Title 35, United States Code, Section 119(e) of U.S. provisional patent application Ser. No. 61/169,516 filed Apr. 15, 2009. The 61/169,516 application. The 61/169,516 application is hereby incorporated by reference into this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to a smartcard and more specifically it relates to a smartcard connector for efficiently connecting a smartcard and/or badge holder to a computer or other electronic device for transferring and/or accessing data.

Description of the Related Art

Any discussion of the related art throughout the specification should in no way be considered as an admission that such related art is widely known or forms part of common general knowledge in the field.

Smartcards including contact, contactless, RFID, etc. are employed in a wide range of applications. The smartcards may be credit card sized and have embedded microchips within or upon the smartcards that store data, such as financial data, health data, or other personal data. Generally, smartcards communicate with other devices through a card reader via contact of the card to the card reader or in a wireless manner, such as by using magnetic waves, radio frequency (RF), infrared, microwave, light, and/or ultraviolet radiation.

As a result of the wireless transmission of data from the smartcard, the smartcard can often times be read without the owner's awareness or permission. Because of the ease in accessing a wireless transmitting smartcard without the owner's awareness or permission, smartcards are often carried within shielding card holders to block any wireless transmission of data to and from the smartcard.

When using a card reader that requires contact with the smartcard for communicating data, it is necessary for the owner of the smartcard to remove the smartcard from the card holder, wallet, etc. and physically engage the card with the card reader. Constantly removing the smartcard from the card holder can be tedious and can often result in the owner of the smartcard forgetting to replace the smartcard back in the respective holder. Because of the inherent problems with the related art, there is a need for a new and improved smartcard connector for efficiently connecting a smartcard and/or badge holder to a computer or other electronic device for transferring and/or accessing data.

BRIEF SUMMARY OF THE INVENTION

A system for efficiently connecting a smartcard and/or badge holder to a computer or other electronic device for transferring and/or accessing data. The invention generally relates to a smartcard which includes a card holder having a card holding space, a contact pad connected to the card holder and in communicative contact with the card holding space, and an external adapter connected to the card holder and in electrical contact with the contact pad. The external adapter is for communicatively connecting a smartcard received and held within the card holding space and in electrical contact with the contact pad to an external data transfer cable via connection of the external data transfer cord to the external adapter. The data transfer cable is subsequently connected to an electrical device, such as a computer, so that the smartcard may be accessed by the computer without removing the smartcard from the card holder. The card holder may also include a battery, display screen, read/write memory, security unit, notification unit, amplification unit, and/or a light.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
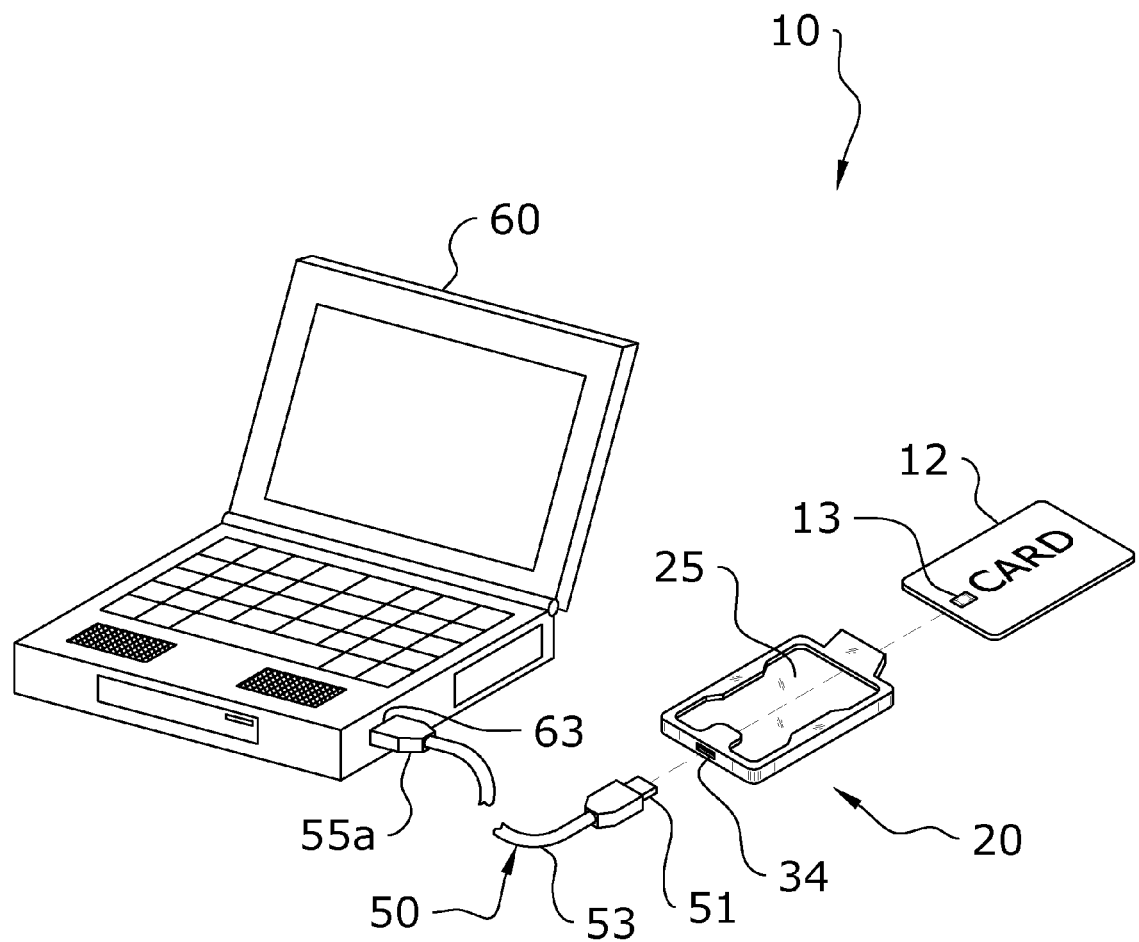
FIG. 1 is an upper perspective view of the present invention with the smartcard exploded in an exemplary manner the card holder and the card holder exploded from a first end connector of the data transfer cable, wherein the second end connector of the data transfer cable is connected to the electronic device.
Figure 2:
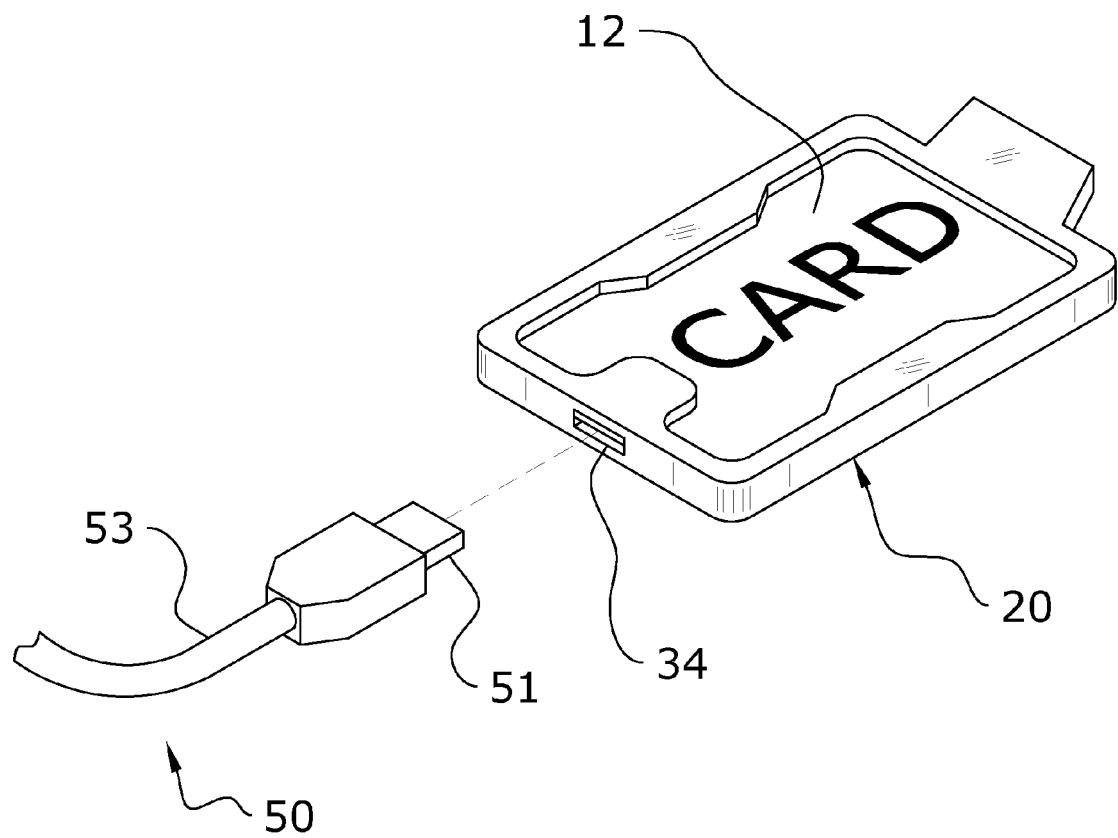
FIG. 2 is an upper perspective view of the present invention with the smartcard inserted within the card holder and the card holder exploded from a first end connector of the data transfer cable.
Figure 3:
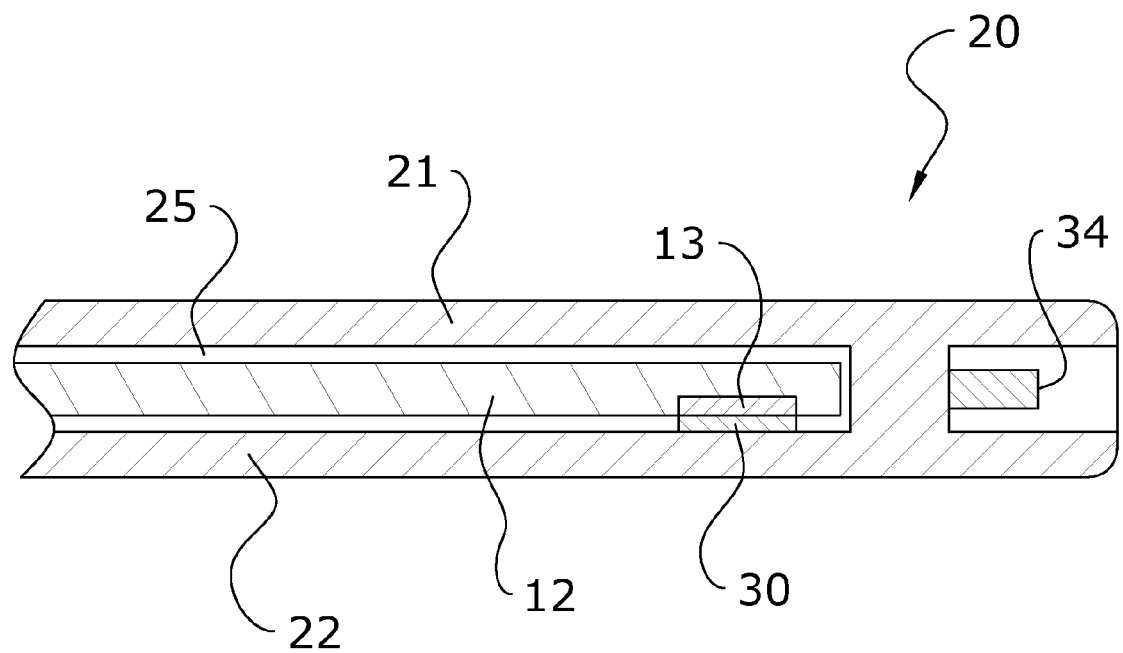
FIG. 3 is a side sectional view illustrating the smartcard within the card holder making contact with the contact pad of the card holder.
Figure 4:
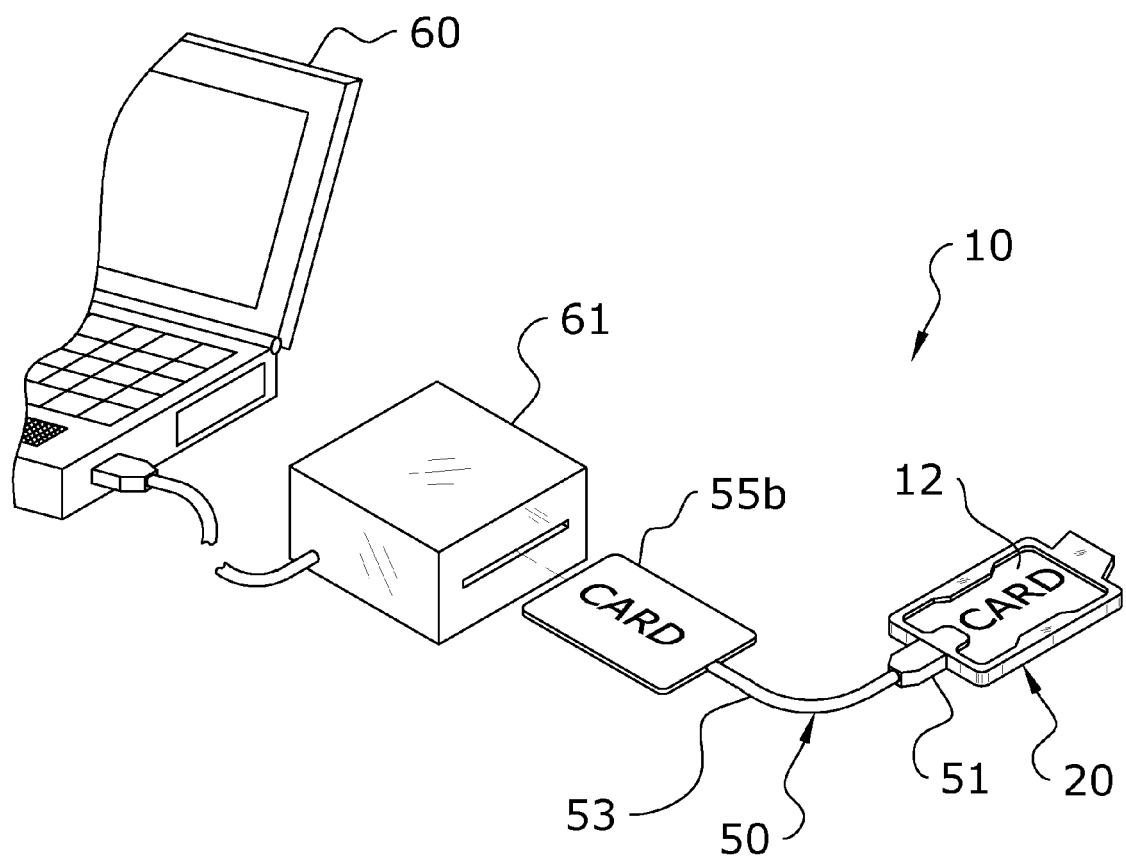
FIG. 4 is an upper perspective view of the present invention illustrating an alternate second end connector of the data transfer cable being comprised of a secondary smartcard capable of transferring data from the smartcard within the card holder to be read by the card holder of the electronic device.

A. Overview.

Turning now descriptively to the drawings, in which similar reference characters denote similar elements throughout the several views, FIGS. 1 through 17 illustrate a smartcard connector 10, which comprises a card holder 20 having a card holding space 25, a contact pad 30 connected to the card holder 20 and in communicative contact with the card holding space 25, and an external adapter 34 connected to the card holder 20 and in electrical contact with the contact pad 30.

The external adapter 34 is for communicatively connecting a smartcard 12 received and held within the card holding space 25 and in electrical contact with the contact pad 30 to an external data transfer cable 50 via connection of the external data transfer cable 50 to the external adapter 34. The data transfer cable 50 is subsequently connected to an electronic device 60, such as a computer, so that the smartcard 12 may be accessed by the computer without removing the smartcard 12 from the card holder 20.

Figure 5:
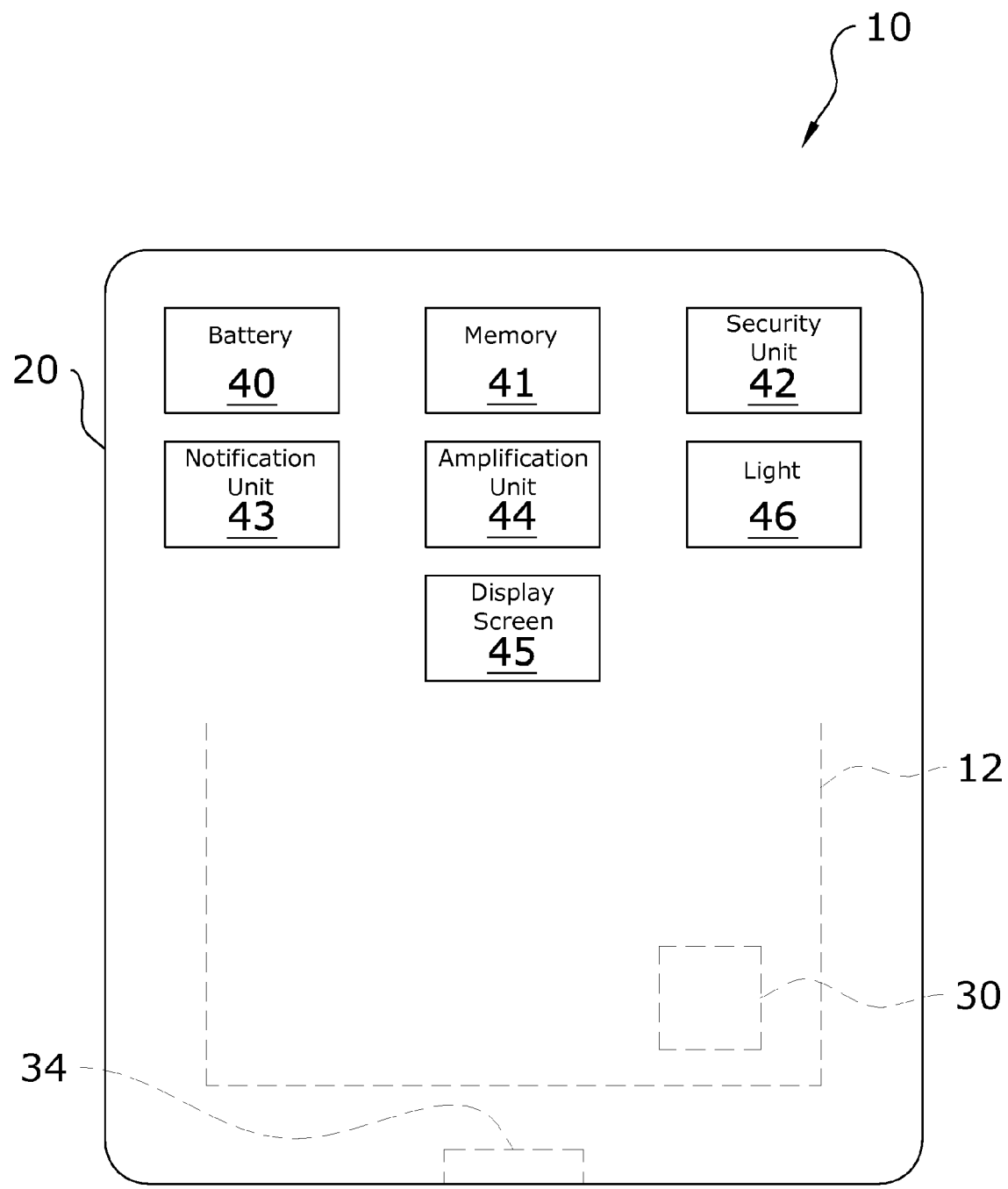
FIG. 5 is an exemplary diagram of the card holder having the battery, memory, security unit, notification unit, amplification unit, display screen, and light.

The card holder 20 may also include a battery 40, read/write memory 41, security unit 42, notification unit 43, amplification unit 44, display screen 45, and/or light 46 in various combinations. FIG. 5 illustrates exemplary alternate features of the card holder 20, such as the battery 40, memory 41, security unit 42, notification unit 43, amplification unit 44, display screen 45, and light 46. It is appreciated that the alternate features 40-46 are illustrated for example only and no electrical connections are illustrated with the alternate features 40-44 and 46 when, in actuality, the alternate features 40-46 may be connected to each other in various manners required for powering the alternate features 40-46, accessing the alternate features 40-46, or for various other reasons. It is appreciated that various methods may be used to connect the alternate features 40-46, wherein the connection methods are common in the prior art of batteries, read/write memory units, etc. and for this reason are not illustrated in detail.

B. Smartcard.

Various types of communicative smartcards 12 may be utilized with the present invention. Such smartcards include, but are not limited to RFID smartcards, contactless smartcards, contact smartcards, RFID passports, and/or any other contact or contactless device that contains electronic data and may be placed within the card holder 20. The smartcard 12 is generally a square shape and credit-card sized; however various shapes and sizes may be appreciated.

The smartcard 12 also preferably includes a contact pad 13 accessible from a portion of an outer surface of the smartcard 12. The contact pad 13 is generally metal-plated and used to transfer data between the smartcard 12 and a card reader 61. The contact pad 13 can be various sizes and configurations all which transfer data or allow data to be accessed from the smartcard 12 upon contact with a mating connector 30 to the contact pad 13. The exemplary word "CARD" is illustrated on the smartcard 12 and the second end connector 55b auxiliary smartcard in the Figures; it is appreciated that the exemplary word is simply illustrative and various information or designs may be located upon either the smartcard 12 or the second end connector 55b.

C. Card Holder.

The card holder 20 may be structured to hold various types and sizes of smartcards 12 including but not limited to badges, financial data cards, personal information cards, passports, etc. U.S. Pat. No. 7,635,089 (Device for Shielding Reading of a Contactless Smartcard) to Augustinowicz et al. and the SECURE BADGEHOLDER sold by IDENTITY STRONGHOLD illustrate examples of a card holder 20 that may be utilized within the present invention and is hereby incorporated by reference herein.

Generally, the card holder 20 is a handheld item and may include various neck straps, belt connectors, etc. for holding and carrying the card holder 20. The card holder 20 generally includes a first panel 21 and a second panel 22, wherein the second panel 22 is movably connected to the first panel 21 via a movable connection such as a hinge and the like as illustrated in FIGS. 6 through 10c of the drawings. A first tab extension 26 may angularly extend from the first panel 21 and a second tab extension 27 may angularly extend from the second panel 22 to provide gripping surfaces on which to push inwardly upon and operate the movable connection to open and close the first panel 21 and the second panel 22 of the card holder 20 thus providing access to the card holding space 25 there between. It is appreciated that FIG. 1 illustrates the smartcard 12 exploded from the card holder 20 in an exemplary manner; however the card holder 20 may receive the smartcard 12 in the manner disclosed by incorporated U.S. Pat. No. 7,635,089 and the SECURE BADGEHOLDER sold by IDENTITY STRONGHOLD.

The card holding space 25 is generally a suitable size for holding the smartcard 12. The card holding space 25 may be completely enclosed by the first panel 21 and the second panel 22 (when in the closed position) or may be partially open to an exterior of the card holder 20. In either case, the card holding space 25 receives the smartcard 12 and is suited for removably holding the smartcard 12 within the card holder 20.

The first panel 21 and/or the second panel 22 may include shielding materials for shielding a wireless transmission of data, such as common with contactless or RFID smartcards 12. Alternately, the first panel 21 and/or the second panel 22 may not have shielding materials. It is appreciated that the card holder 20 may be comprised of various alternate structures than illustrated all which removably hold a smartcard 12. In the case of a dual interface smartcard 12 with contact and contactless interfaces, the shielding card holder 20 would allow the card holder 20 to continue to shield the contactless interface of the smartcard 12 while the smartcard 12 is connected to the electronic device 60 through the data transfer cable 50 and adapter 34.

The card holder 20 includes an internal first signal transfer means 30 adapted to receive electrical or data signals through contacting the contact pad 13 or in alternate manners. In the preferred, the first signal transfer means 30 is comprised of a contact pad located internal to the card holder 20 and in communicative contact with the card holding space 25 so that the contact pad 30 may electrically contact the contact pad 13 of the smartcard 12 when the smartcard 12 is placed within the card holding space 25 of the card holder 20.

The contact pad 30 is integrally connected to the card holder 20 and may extend from the first panel 21, the second panel 22, or other elements of the card holder 20 all which position the contact pad 30 to make electrical contact with the contact pad 13 of the smartcard 12 when the smartcard 12 is positioned within card holding space 25. Like the contact pad 13 of the smartcard 12, the contact pad 30 of the card holder 20 may have various metal-coated plates or be structured in various manners to mate with the contact pad 13 of the smartcard 12 and maintain an electrical or data transfer connection.

The card holder 20 includes an external second signal transfer means 34 adapted to receive electrical or data signals from the contact pad 30 of the card holder 20. In the preferred, the second signal transfer means 34 is comprised of an adapter located external to the card holder 20 or accessible from an exterior of the card holder 20 and in electrical and/or communicative contact with the contact pad 30 of the card holder 20 so that the contact pad 30 of the card holder 20 may electrically connect the contact pad 13 of the smartcard 12 with the adapter 34 when the smartcard 12 is placed within the card holding space 25 of the card holder 20.

The adapter 34 may be connected to the first panel 21, second panel 22, or other elements of the card holder 20 all which allow for electrical connection to the contact pad 30 of the card holder 20. The adapter 34 may be comprised of a plug or socket structure and may be adapted to receive USB connectors or various other types of connectors capable of transferring data from the smartcard 12. The adapter 34 may be recessed within the card holder 20 or extend outwardly from the card holder 20.

D. Battery.

The card holder 20 may include a rechargeable battery 40 or other electrical storage unit contained within the card holder 20 that could charge while the electronic device 60 is attached to the card holder 20 via the data transfer cable 50. The battery 40 could additionally be used for a light 46 or other electronics of the card holder 20. Various non-rechargeable or rechargeable batteries may also be utilized with the card holder 20 as appreciated.

E. Memory.

The card holder 20 may also include a built-in flash drive or other read/write memory chip 41 that would allow data storage in the card holder 20. Various amounts of memory 41 may be used with the memory 41 and the memory 41 would preferably be communicatively connected to the adapter 34 thus allowing the transfer of data to and/or from the memory 41 through the data transfer cable 50 removably connected to the adapter 34 of the card holder 20.

F. Security Unit.

The card holder 20 may also include a security unit 42 to prevent access to the memory 41 through the adapter 34 unless an authorized smartcard 12 is in electrical contact with the contact pad 30 of the card holder 20. The security unit 42 may alternately or additionally be software within the memory 41 or a biometric sensor for preventing access to the smartcard 12 through the adapter 34 and/or the memory 41 without proper identification through biometric means. The biometric sensor embodied security unit 42 would preferably be located upon the card holder 20 and may be powered via the electronic device 60 and/or battery 40. The security unit 42 in generally may also be powered via the electronic device 60 and/or battery 40.

G. Notification Unit.

The card holder 20 may also include a notification unit 43 comprising audio and/or visual notification devices to alert an individual if the contained smartcard 12 within the card holder 20 is being accessed and/or if an RF carrier is present and at the same frequency as the contained smartcard 12. Various speakers and/or displays may be located upon the card holder 20 to provide the audio and/or visual notification as appreciated. The notification unit 43 may be powered via the rechargeable battery 40 and/or the connected electronic device 60.

H. Amplification Unit.

In another embodiment, the card holder 20 may have an amplification unit 44 that would allow for longer range reading and sending of data from a contactless smartcard 12 inserted within the card holding space 25 of the card holder 20. The amplification unit 44 would generally be connected to the smartcard 12 through the contact pad 30 of the card holder 20 and may be powered in various manners, such as by the rechargeable battery 40 and/or the connected electronic device 60.

I. Display Screen.

The card holder 20 may also include a display screen 45 or window 24 for viewing and/or displaying smartcard 12 data. The display screen 45 may electronic or simply a transparent window to view the data. The display screen 45 would be electrically connected to the adapter 34 for being powered by the electronic device 60 or alternately electrically connected to a battery 40.

The window 24 is preferably transparent or semi-transparent to allow for viewing of the smartcard 12. The window 24 is preferably positioned within the first panel 21 to show the front of the smartcard 12 positioned within the card holder. The window 24 preferably covers over 90 percent of the surface area of the first panel 21. The window 24 is positioned within an opening within the first panel 21. Alternatively, the first panel 21 may have an opening instead of a window 24 where the window 24 is represented thereby allowing physical contact with the smartcard 12.

J. Light.

The card holder 20 may also include a light 46 for decoration or for visual use. The light 46 could be located upon the exterior of the card holder 20 and would generally be powered by the electronic device 60 through the data transfer cable 50 connected to the adapter 34. The light 46 would thus be electrically connected to the adapter 34 for being powered by the electronic device 60 or alternately electrically connected to a battery 40.

K. Data Transfer Cable.

The data transfer cable 50 is adapted to electrically connect to the adapter 34 of the card holder 20 to transfer data from or to the smartcard 12 electrically connected to the contact pad 30 of the card holder 20. The data transfer cable 50 generally includes a first end connector 51, an elongated cord 53 extending therefrom, and a second end connector 55a, 55b extending from an opposing end of the cord 53. It is appreciated that the data cable 50 may be easily disconnected from the card holder 20 and/or the electronic device 60, such as in the case that the user forgets to unplug the cable 50 from the card holder 20 before beginning to walk away with the card holder 20, wherein the card holder 20 would easily automatically disconnect from the cable 50.

The first end connector 51 may have various plugs and/or sockets to electrically connect to the adapter 34 of the card holder 20 in a manner that allows for data transfer or access. An example of a suitable plug is a USB connector; however it is appreciated that the first end connector 51 may be comprised of various structures all which mate with the adapter 34 and allow for a removable and secure connection to the adapter 34.

Likewise, the second end connector 55a, 55b may have various plugs and/or sockets to electrically connect to the electronic device 60 in a manner that allows for data transfer or access. An example of a suitable plug is a USB connector; however it is appreciated that the second end connector 55a, 55b may be comprised of various structures all which mate with the connector 61, 63 of the electronic device 60. For example, an auxiliary smartcard 55b with a corresponding auxiliary contact pad 16 may comprise the second end connector 55b to be received by a card reader 61 of the electronic device 60 and thus interface the cable 50 with the card reader 61 to communicate the data from the smartcard 12 within the card holder 20. It is appreciated that the auxiliary smartcard 55b would also include contact points (e.g. auxiliary contact pad 16) for communicating with and being read by the card reader 61 the same as a conventional smartcard 12.

L. Electronic Device.

The electronic device 60 may be any type of device that drives data transfer or access to and/or from the smartcard 12. Suitable devices include personal computers, such as laptops, desktop computers, etc. Various other devices, such as PDAs, smart phones, etc. may be used as the electronic device 60. The electronic device 60 generally includes at least one port 63 or card reader 61 to receive the second end connector 55a, 55b of the data transfer cable 50.

M. Operation of Preferred Embodiment.

In use, when information is desired to be transferred, read, or otherwise accessed from the smartcard 12 within the card holder 20, the first end connector 51 of the data transfer cable 50 is connected to the adapter 34 and the second end connector 55a, 55b of the data transfer cable 50 is connected to or read by the electronic device 60. Data may now be transferred between the smartcard 12 and the electronic device 60 without having to remove the smartcard 12 from the card holder 20.

When the owner of the smartcard 12 is finished transferring or accessing data, the first end connector 51 of the data transfer cable 50 is simply removed from the adapter 34 thus freeing the smartcard 12 from the data transfer cable 50 and preventing any further access to the smartcard 12 through the contact pad 13 of the smartcard 12.

N. Removable Connector.

Figure 6:
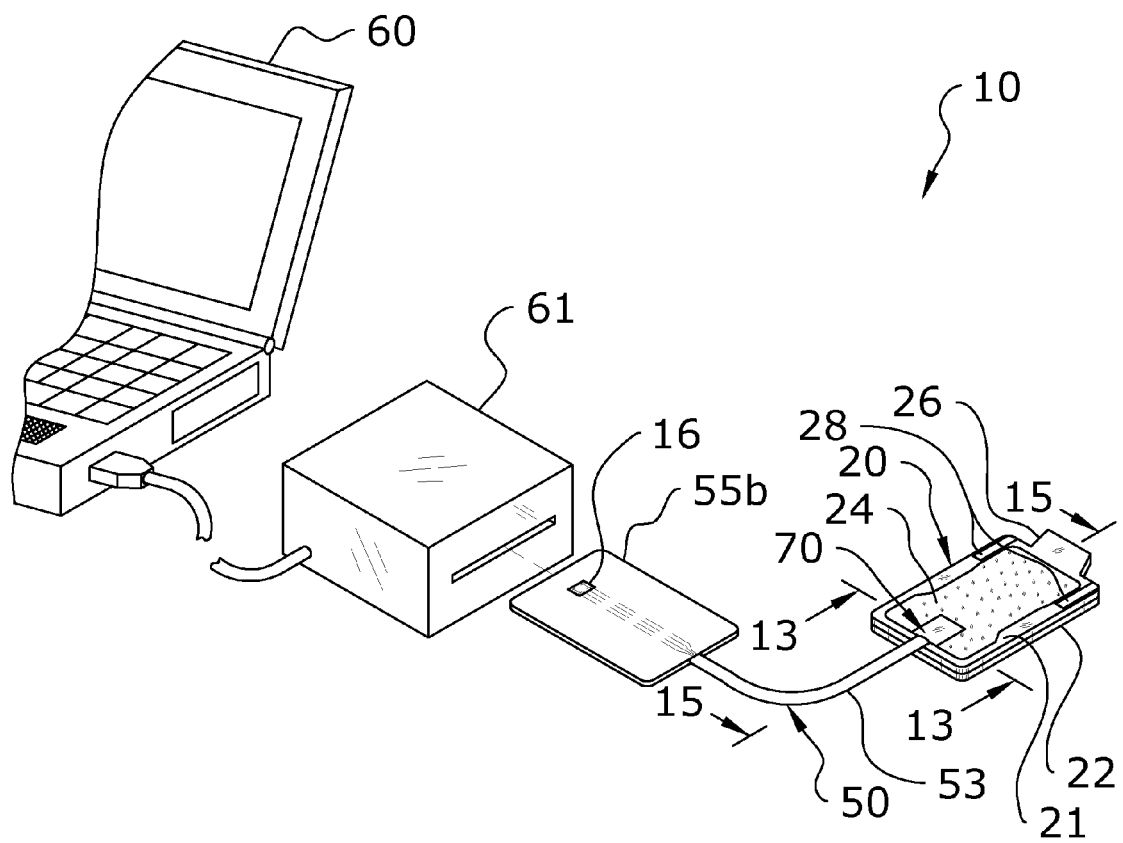
FIG. 6 is an upper perspective view of another embodiment of the present invention having a removable connector electrically connected to the contact pad of the smartcard.
Figure 7:
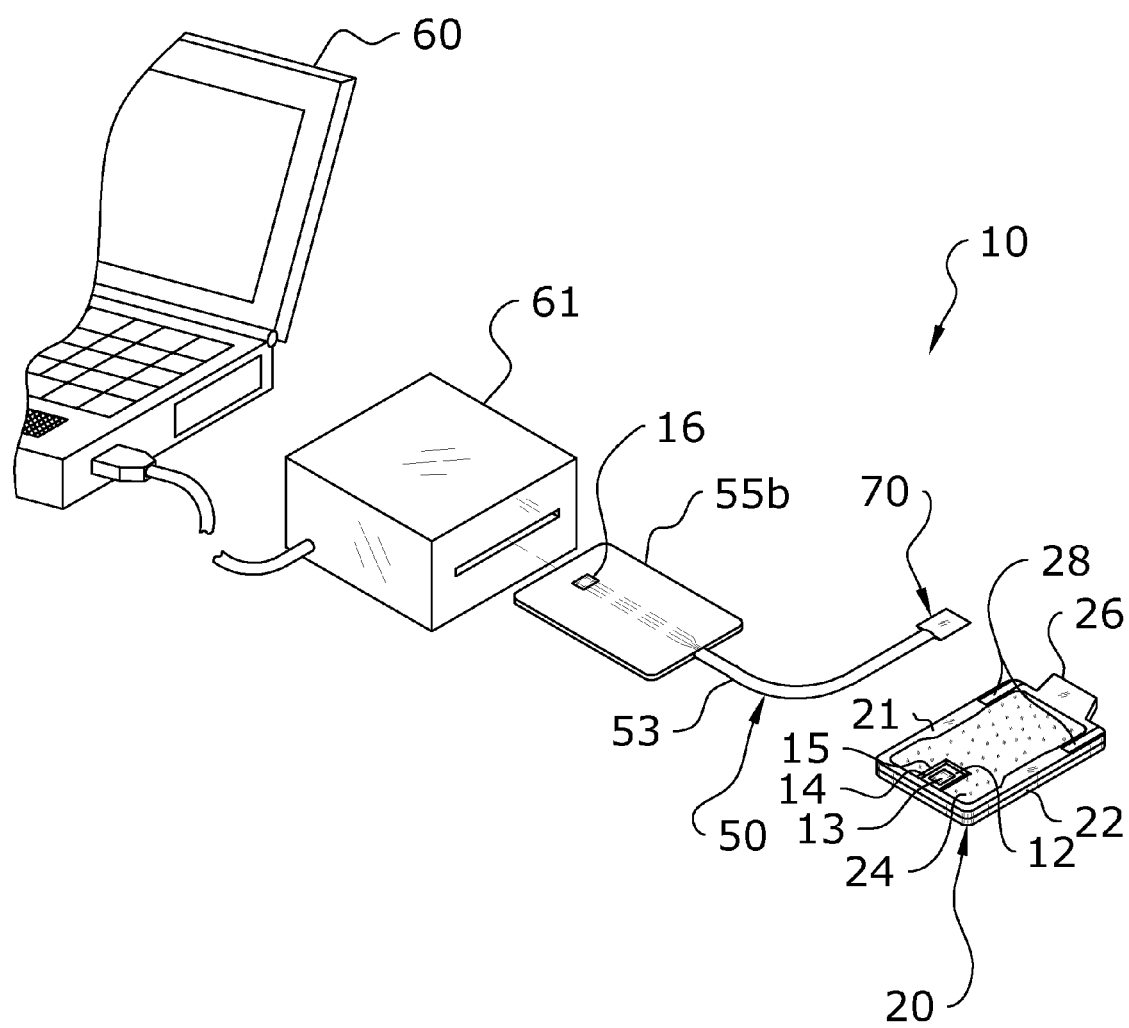
FIG. 7 is an upper perspective view of the removable connector removed from the smartcard.
Figure 8:
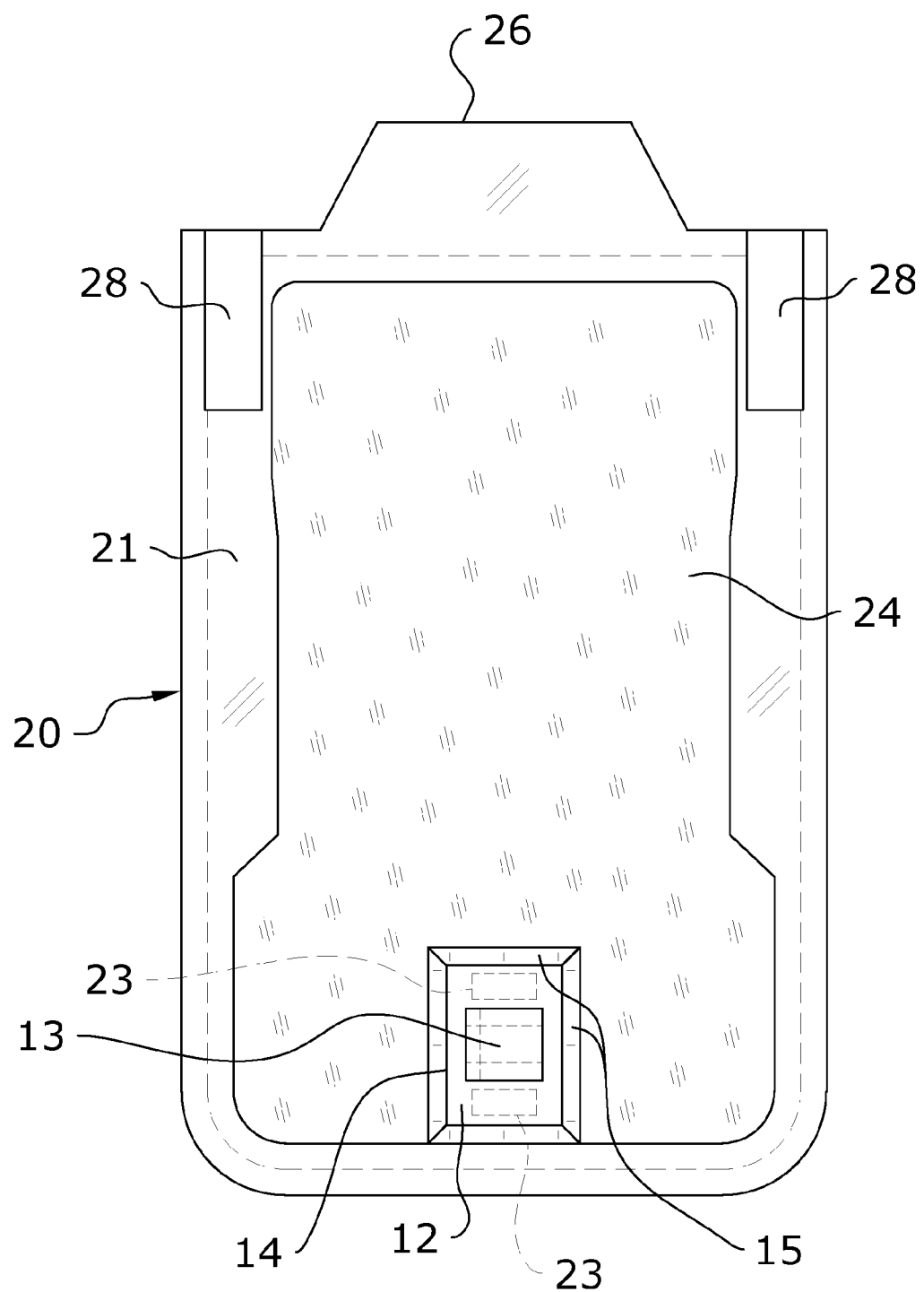
FIG. 8 is a front view of the card holder with a transparent window within the first panel of the card holder and a receiver opening within the transparent window exposing the contact pad of the smartcard.
Figure 13:
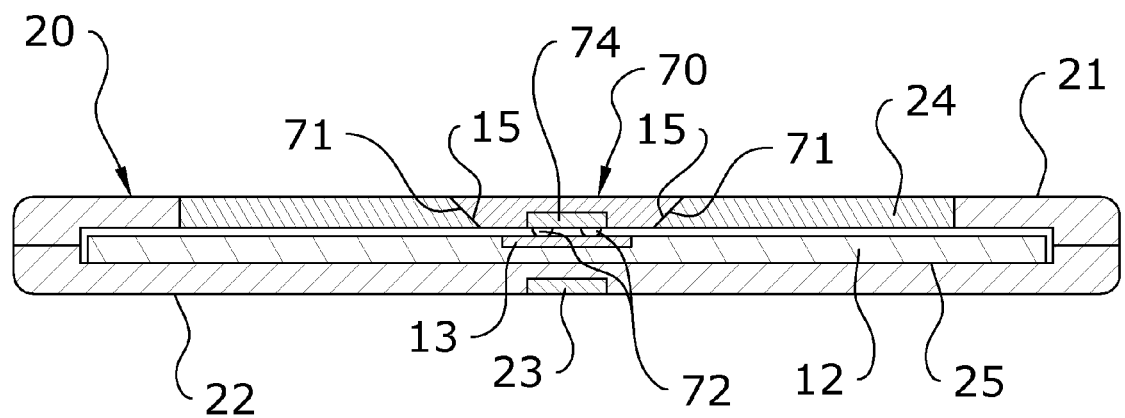
FIG. 13 is a cross sectional view taken along line 13-13 of FIG. 6 illustrating the removable connector attached to the card holder.
Figure 14:
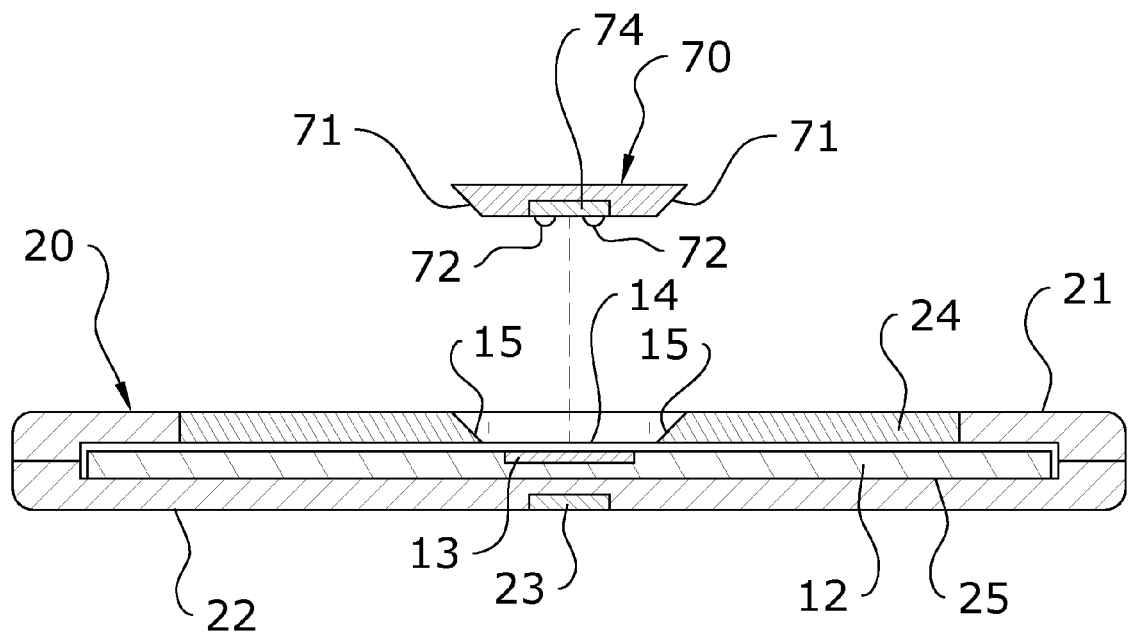
FIG. 14 is a cross sectional view taken along line 13-13 of FIG. 6 with the removable connector separated from the card holder.
Figure 15:
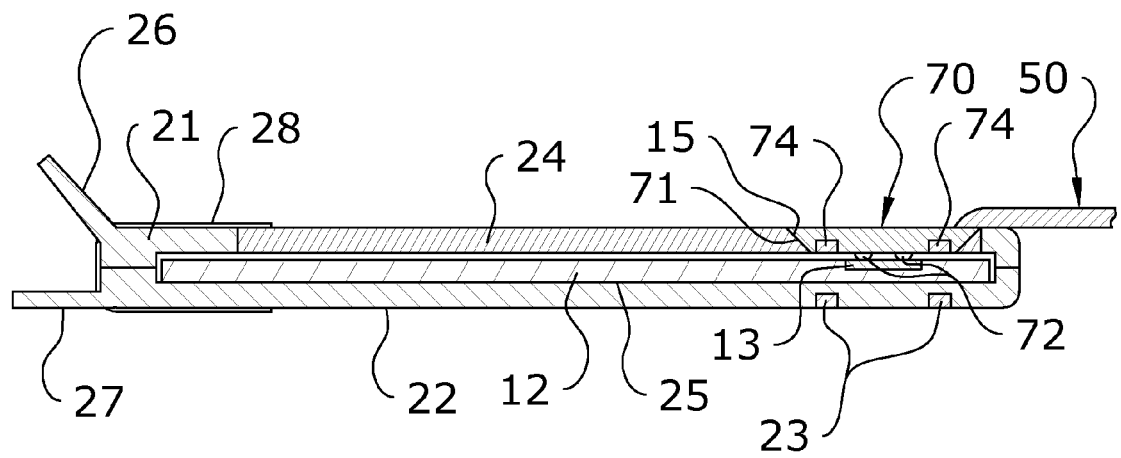
FIG. 15 is a cross sectional view taken along line 15-15 of FIG. 6.
Figure 16:
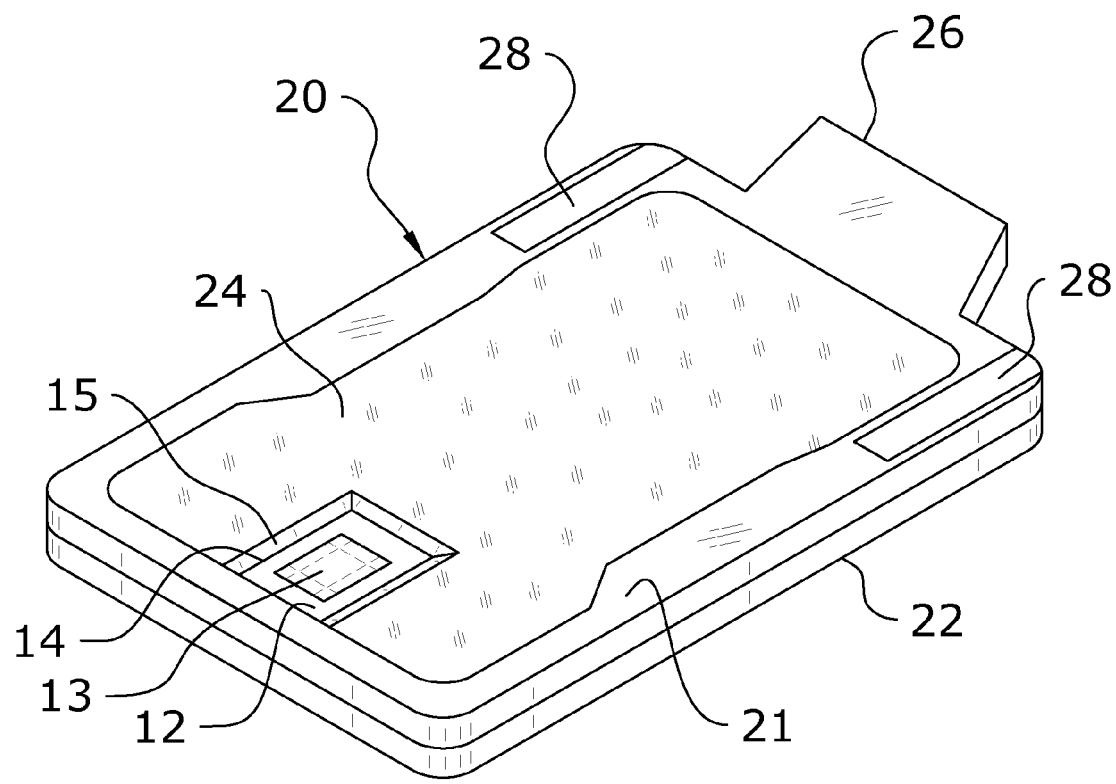
FIG. 16 is an upper perspective view of the card holder with the receiver opening in the transparent window of the second panel.
Figure 17:
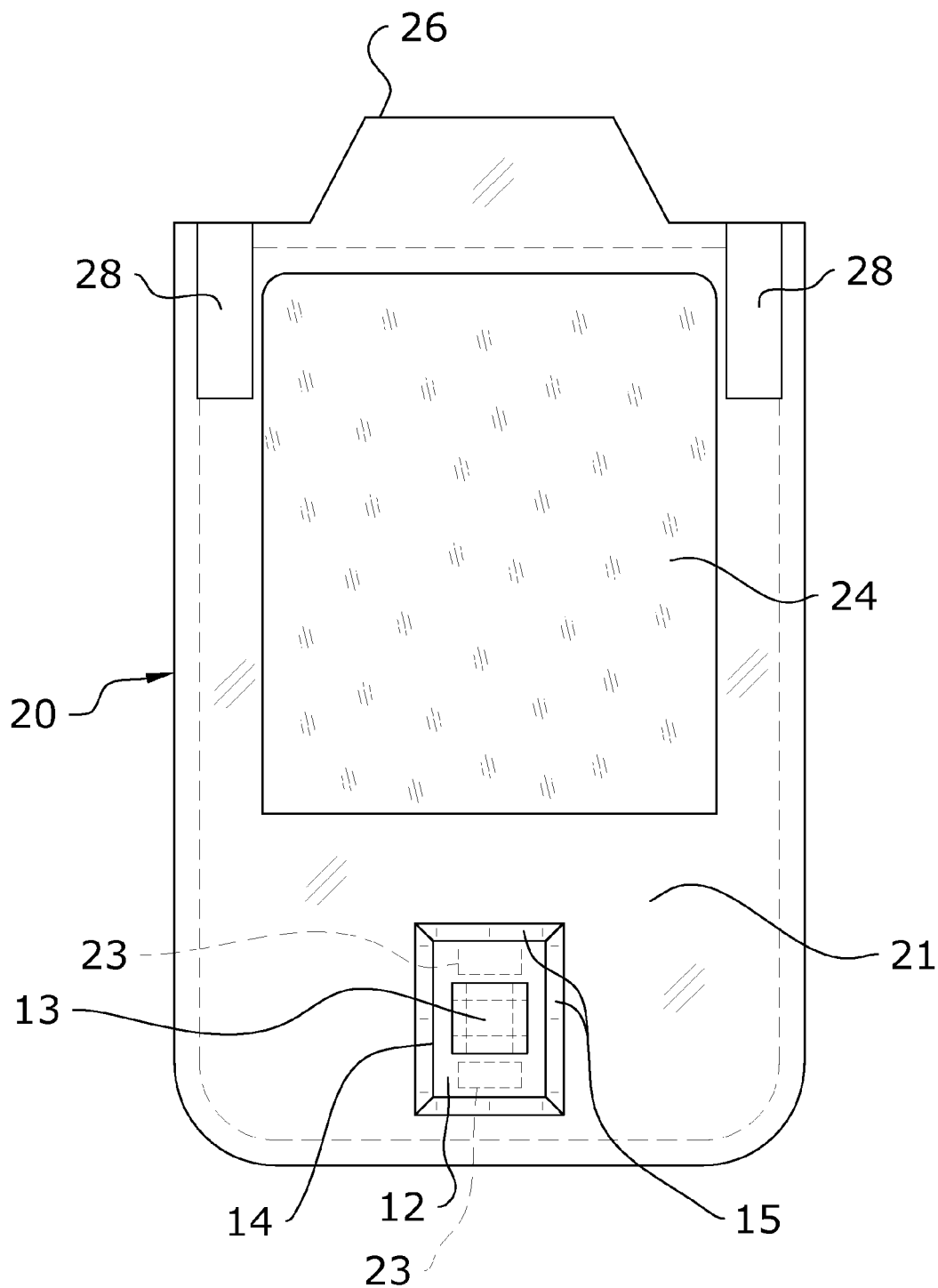
FIG. 17 is a front view of the card holder with the receiver opening within the second panel but not extending into the transparent window.

FIGS. 6 through 14 illustrate a removable connector 70 that removably connects to the card holder and electrically communicates with the contact pad of the smartcard positioned within the card holder. FIGS. 7, 8 and 14 illustrate a receiver opening 14 positioned within the first panel. When a window 24 is utilized within the first panel 21, the receiver opening 14 is preferably positioned within the window. The window may be comprised of plastic, glass or other transparent or semi-transparent material.

The receiver opening 14 preferably has an inner tapered perimeter 15 as illustrated in FIGS. 8 and 14 of the drawings. In one embodiment, the receiver opening 14 is comprised of a rectangular shape having four sides, with each of the four side tapered forming the inner tapered perimeter 15 as illustrated in FIG. 8 of the drawings. The receiver opening 14 may have various other shapes such as circular, triangular and the like. The receiver opening 14 preferably passes completely through the first panel to expose the contact pad 13 of the smartcard 12 so the removable connector 70 may be positioned within the receiver opening 14 and in electrical contact with the contact pad 13 of the smartcard 12. The receiver opening 14 is aligned with a contact pad 13 of the smartcard 12. Furthermore, the receiver opening 14 is preferably larger in size than the contact pad 13 of the smartcard.

The removable connector 70 has a body portion having a shape similar to the shape of the receiver opening 14 (e.g. rectangular, triangular, circular). The removable connector 70 includes an outer tapered perimeter 71 that is approximately the same size and shape as the inner tapered perimeter 15 of the receiver opening 14 such that the removable connector 70 is non-movable from side-to-side and is non-rotatable when positioned within the receiver opening 14. The removable connector 70 includes one or more connector contacts 72 that electrically communicate with the contact pad 13 of the smartcard as illustrated in FIG. 13.

The card holder 20 preferably includes one or more first couplers 23 that removably connect to a corresponding one or more second coupler attached to the removable connector 70. The couplers 23, 74 may be comprised of various coupler technologies that allow for removable attachment of the removable connector 70 to the card holder 20 such as but not limited to snaps, clips or magnets.

In a preferred embodiment of the present invention, the first couplers 23 and the second couplers 74 are each comprised of magnets wherein the first couplers 23 are magnetically attracted to the second couplers 74 to retain the removable connector 70 attached to the card holder. The first couplers 23 are preferably attached to the second panel 22 which is on the backside of the smartcard 12 thereby allowing for a smaller removable connector 70 to be utilized.

Figure 9:
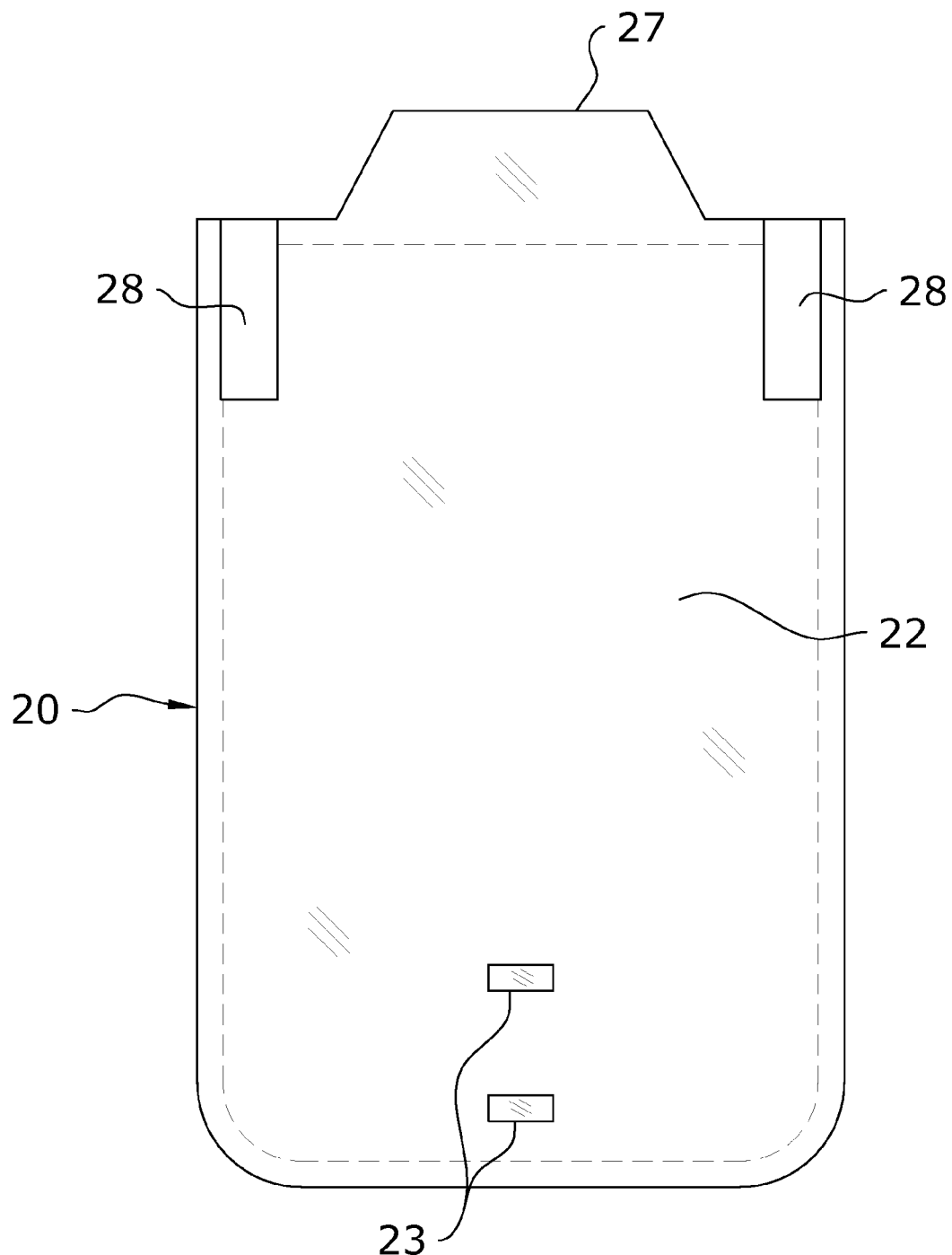
FIG. 9 is a rear view of the card holder illustrating the magnets attached to the second panel of the card holder.
Figure 10A:
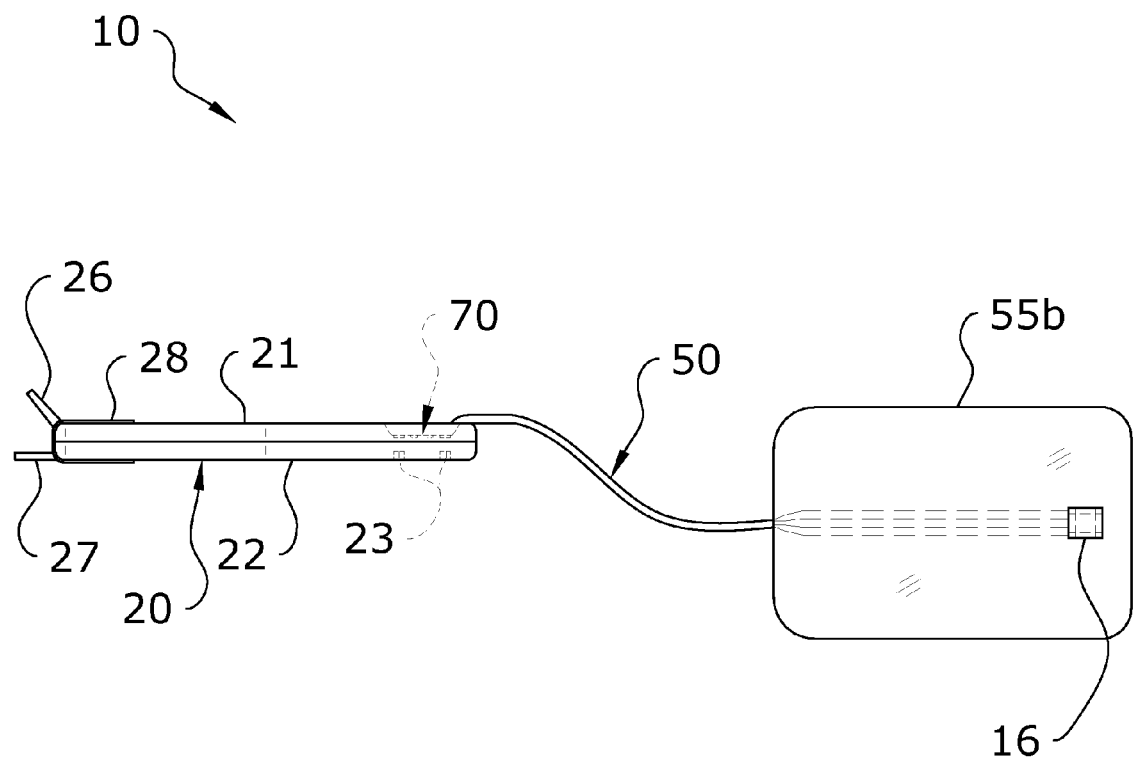
FIG. 10a is a side view of the removable connector attached to the card holder.
Figure 10B:
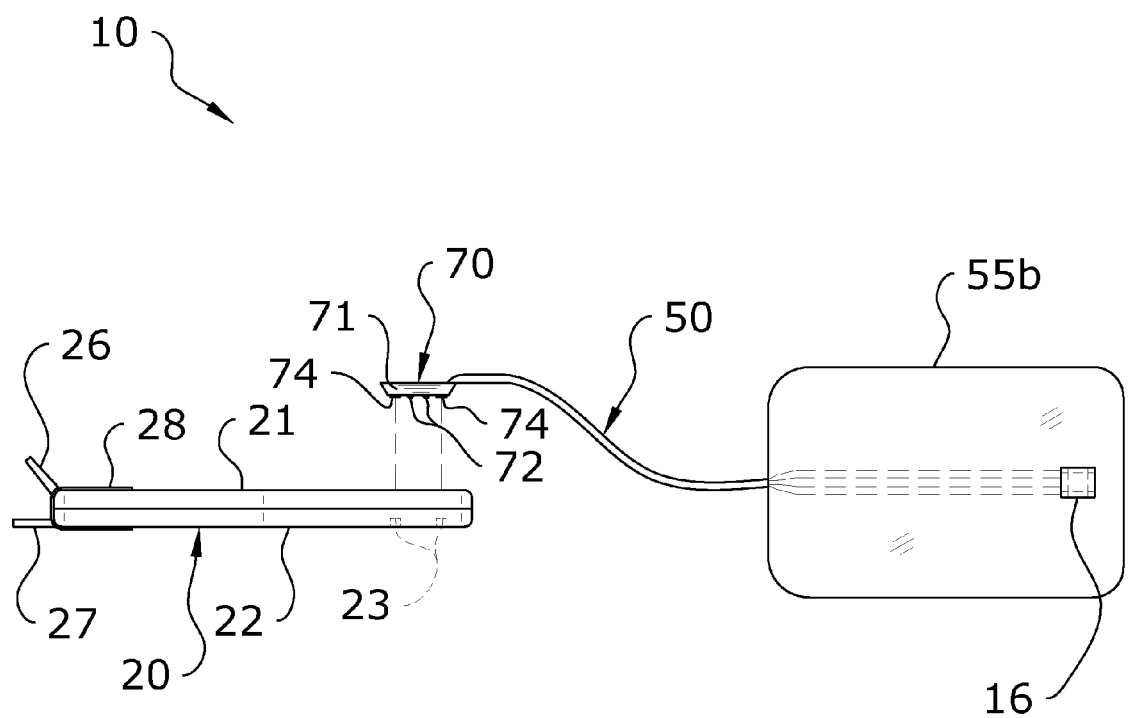
FIG. 10b is a side view of the removable connector removed from the card holder.
Figure 10C:
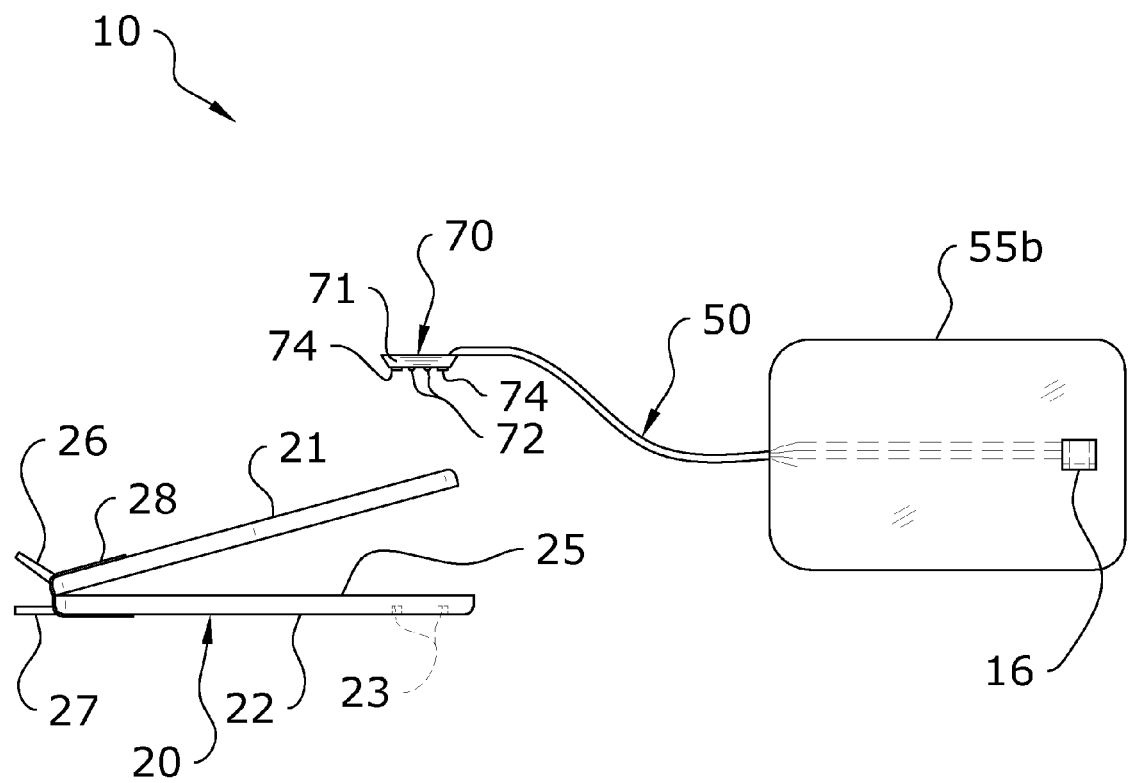
FIG. 10c is a side view of the card holder opened with the removable connector separated from the card holder.
Figure 11:
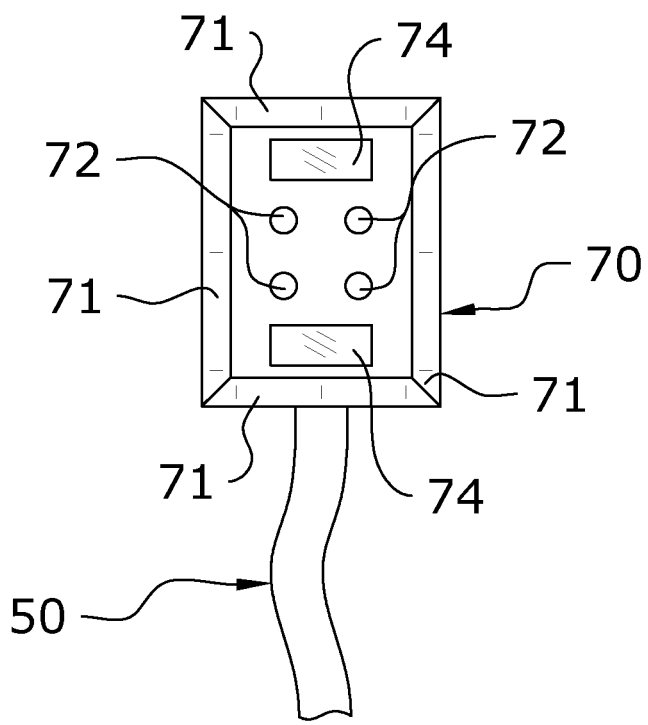
FIG. 11 is a front view of the removable connector illustrating the outer tapered perimeter, the connector magnets and the connector contacts.
Figure 12:
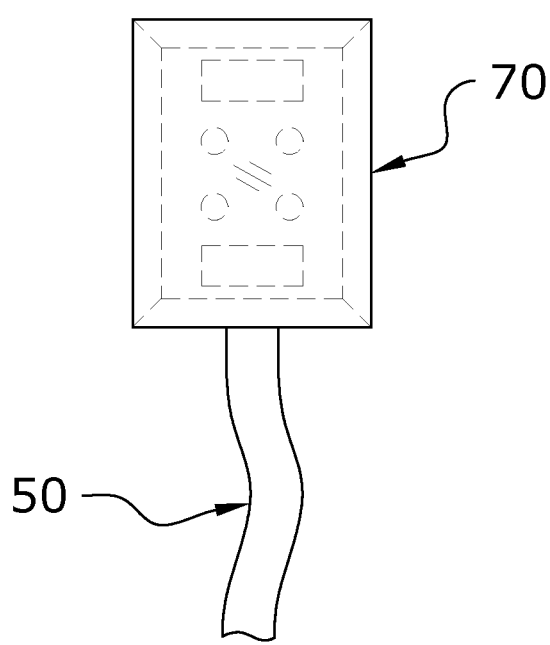
FIG. 12 is a rear view of the removable connector.

The first couplers 23 may be attached to the inner surface of the second panel, within the second panel either completely or partially or attached to the outer surface of the second panel (FIGS. 9, 13 and 14 illustrate the first couplers 23 attached to the outer surface opposite of the smartcard 12). Alternatively, the first couplers 23 may be attached to the first panel 21.

The magnets used for the couplers 23, 74 have a magnetic strength sufficient for the magnetic fields to pass through a smartcard 12 and retain the removable connector 70 attached to the card holder 20. In particular, when the removable connector 70 is positioned within the receiver opening 14 as illustrated in FIGS. 6 and 13 of the drawings, the magnetic force of the first couplers 23 and the second couplers 74 retains the removable connector 70 within the receiver opening 14 adjacent to the surface of the smartcard such that the connector contacts 72 are in physical and electrical contact with the contact pad 13 of the smartcard 12. It is further preferable that a pair of the first couplers 23 are positioned near a first end and a second end respectively of the contact pad 13 of the smartcard 12 when positioned within the card holder to reduce the magnetic field that passes through the contact pad 13 as illustrated in FIG. 8 of the drawings. The second couplers 74 of the removable connector 70 are aligned with and distally spaced the same distance apart as the first couplers 23.

In use, if a user opens the card holder 20 separating the first panel 21 from the second panel 22, the second couplers 74 of the removable connector 70 are separated a distance sufficient from the first couplers 23 such that the magnetic force between the couplers 23, 74 is insufficient to retain the removable connector 70 within the receiver opening 14. Also, if an external force is applied to the second end connector 55a, 55b and/or the data transfer cable 50 wherein the external force is greater than the magnetic force between the couplers 23, 74, the removable connector 70 will be removed from the receiver opening 14. It is desirable to have the removable connection of the removable connector 70 with the card holder so a user may insert the second end connector 55a, 55b into a reader for a computer or other device at their desk and leave the second end connector 55a, 55b within the reader if they have to leave their desk for a period of time. However, when the user disconnects the removable connector 70 from the card holder 20 (intentionally or unintentionally), the second end connector 55a, 55b is no longer operational as an auxiliary card or the like until the user reconnects the removable connector 70 to the card holder.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A smartcard connector system, comprising:
a card holder adapted for receiving a smartcard;
a first coupler attached to said card holder; and
a removable connector having a second coupler, wherein said second coupler is removably connectable to said first coupler and wherein when said second coupler is connected to said first coupler said removable connector communicates with said smartcard;
wherein said card holder is comprised of a first panel and a second panel, wherein said first coupler is attached to said first panel and wherein said removable connector is attached to said second panel, wherein said first coupler is comprised of a first magnet and wherein said second coupler is comprised of a second magnet, wherein the smart card is positioned between said first coupler and said second coupler.

2. The smartcard connector system of claim 1, wherein said first coupler is comprised of a first magnet and said second coupler is comprised of a second magnet.

3. The smartcard connector system of claim 2, wherein said first magnet is aligned with said second magnet.

4. The smartcard connector system of claim 1, wherein said first coupler is comprised of a plurality of first magnets and wherein said second coupler is comprised of a plurality of second magnets.

5. The smartcard connector system of claim 4, wherein said plurality of first magnets are aligned with said plurality of second magnets.

6. The smartcard connector system of claim 5, wherein said plurality of first magnets magnetically attract said plurality of second magnets to retain said removable connector connected to said card holder.

7. The smartcard connector system of claim 5, wherein said plurality of first magnets are positioned upon said card holder such that a path between each of said plurality of first magnets and corresponding said plurality of second magnets is outside of a contact pad of the smartcard positioned within said card holder.

8. The smartcard connector system of claim 1, wherein said removable connector includes at least one connector contact adapted to electrically communicate with a contact pad of the smartcard positioned within said card holder.

9. The smartcard connector system of claim 1, wherein said card holder includes a receiver opening, wherein said removable connector is removably positioned within said receiver opening.

10. The smartcard connector system of claim 9, wherein said receiver opening exposes a contact pad of the smartcard positioned within said card holder.

11. The smartcard connector system of claim 9, wherein said receiver opening has an inner tapered perimeter and wherein said removable connector has an outer tapered perimeter, wherein said outer tapered perimeter of said removable connector fits within said inner tapered perimeter.

12. The smartcard connector system of claim 11, wherein said receiver opening and said removable connector have the same shape.

13. The smartcard connector system of claim 12, wherein said receiver opening is rectangular.

14. The smartcard connector system of claim 9, wherein said card holder includes a window and wherein said receiver opening is at least partially positioned within said window.

15. The smartcard connector system of claim 14, wherein said receiver opening is completely positioned within said window.

16. The smartcard connector system of claim 9, wherein said first coupler is aligned with said receiver opening.

17. The smartcard connector system of claim 1, wherein said first panel is pivotally connected to said second panel.

18. The smartcard connector system of claim 1, including a data transfer cable connected to said removable connector and an auxiliary card connected to said data transfer cable.

* * * * *